(12) United States Patent
Sheppard

(10) Patent No.: US 9,338,679 B1
(45) Date of Patent: May 10, 2016

(54) SYSTEMS AND METHODS FOR ANALYZING RADIO FREQUENCY EXPOSURE COMPLIANCE

(71) Applicant: Verizon Patent and Licensing Inc., Arlington, VA (US)

(72) Inventor: Christopher J. Sheppard, Carrollton, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 14/633,881

(22) Filed: Feb. 27, 2015

(51) Int. Cl.
 *H04W 24/08* (2009.01)
 *H04B 17/18* (2015.01)
 *H04W 24/10* (2009.01)
 *H04W 52/36* (2009.01)
 *H04W 72/00* (2009.01)

(52) U.S. Cl.
 CPC .............. *H04W 24/08* (2013.01); *H04B 17/18* (2015.01); *H04W 24/10* (2013.01); *H04W 52/36* (2013.01)

(58) Field of Classification Search
 CPC ..... H04W 16/18; H04W 16/20; H04W 16/22; H04W 24/00; H04L 12/2456
 USPC .................................. 455/67.7, 445, 446
 See application file for complete search history.

(56) References Cited

U.S. PATENT DOCUMENTS

| 8,583,446 | B2* | 11/2013 | Williams | ............... G06Q 10/10 705/1.1 |
| 2004/0030562 | A1* | 2/2004 | Williams | ............... H04W 16/18 705/325 |

* cited by examiner

*Primary Examiner* — Lee Nguyen

(57) ABSTRACT

Systems and methods for evaluating a proposed site for an RF transmitting structure are described. The system receives information relating to the proposed structure, and gathers additional data related to the inputs. The system calculates a conservative estimate of the spatially-averaged power density levels (in $mW/cm^2$) a 6-foot human would be exposed to from electromagnetic fields produced by the RF transmitting structure at both the surface level and axis level for service antennas, and at the axis level for donor antennas. The system determines the total percentage of the maximum MPE limit that a 6-foot human would be exposed to at both the surface level and axis level for service antennas, and at the axis level for donor antennas. The system recommends compliance mitigation actions. The system generates a compliance record that includes an indication of whether the proposed site is approved, conditionally approved, or not approved, based in part on the percentages.

19 Claims, 7 Drawing Sheets

Figure 3
300

Radio Frequency (RF) Exposure Compliance Analysis Tool 300

| | | Clear All Data | 310 | Provider may contribute up to 100% of applicable MPE limit. |
| --- | --- | --- | --- | --- |
| Site Name | 304 | Multi-Licensee Facility | 312 | |
| Site Address | 306 | High-Power Broadcast (AM/FM/TV) Collocators | 314 | Uncontrolled Environment – General Population MPE limits apply. |
| State | City | Existing/Future Fence Around Base of Structure | | |
| Project Type | 308 | Projected In-Service Date | 316 | Maximum Permissible Exposure (MPE) |

302a Import GeoPlan Data 302b

SERVICE ANTENNA INFORMATION

| Lowest Transmit Frequency (MHz) | Antenna Manufacturer | Antenna Model | Max Antenna Dimension (ft) | Power Per Transmitter (W) | # of Trans | Loss (dB) | Distance to Bottom of Lowest Antenna (ft) | Horizontal Beamwidth | Antenna Gain (dBd) | Power: Total Input Power (W) | Limits: FCC General Pop. MPE Limit (µW/cm²) | Near-Field/Far-Field Spatial Average Max % MPE Surface-Level | Max % MPE Axis-Level |
| --- | --- | --- | --- | --- | --- | --- | --- | --- | --- | --- | --- | --- | --- |
| 746 | 318 | 320 | 322 | 324 | 326 | 328 | 330 | 332 | 334 | 336 | 338 | 340 | 342 |
| 850 | | | | | | | | | | | | | |
| 1900 | | | | | | | | | | | | | |
| 2100 | | | | | | | | | | | | | |

DONOR ANTENNA INFORMATION

| Lowest Transmit Frequency (MHz) | Antenna Manufacturer | Antenna Model | Donor Type | Max Antenna Dimension (ft) | Total Input Power (W) | Distance to Bottom of Lowest Antenna (ft) | Horizontal Beamwidth | Antenna Gain (dBd) | FCC General Pop. MPE Limit (µW/cm²) | Max % MPE Axis-Level |
| --- | --- | --- | --- | --- | --- | --- | --- | --- | --- | --- |
| 746 | 344 | 346 | 348 | 350 | 352 | 354 | 356 | 358 | 360 | 362 |
| 850 | | | | | | | | | | |
| 1900 | | | | | | | | | | |
| 2100 | | | | | | | | | | |

RF Compliance Summary

| Total % MPE (General Population): | | | | | | | | | |
| --- | --- | --- | --- | --- | --- | --- | --- | --- | --- |
| Surface-Level: | Axis-Level: | Donor Antenna(s) | Component Requiring Mitigation: | Hot Spot | RF RE-DESIGN | CONSULTANT EVALUATION | NOTICE | CAUTION | WARNING | GUIDELINES | INFORMATION | LANDLORD LTR |
| 364 | 366 | 368 | | 370 | 372 | 374 | 376 | 378 | 380 | 382 | 384 | 386 |
| | | | Service | | | | | | | | | |
| | | | Access | | | | | | | | | |
| | | | Donor | | | | | | | | | |

388

Compliance Requirements Table

ENGINEER CERTIFICATION 390

| Name | John Doe |
| --- | --- |
| Title | Engineer III Cell – RE/Regulatory |
| Phone | 123-456-7890 |
| Region | HQ AREA |
| Date | 8/20/2013 |

I certify that the above information is correct to my knowledge, will implement any requirements for compliance with FCC Guidelines, and will re-evaluate the above-mentioned site should there be any changes that affect the RF Environment.

Generate Record of RF Compliance
392

1234 Sesame Street
Dallas, GA —— 602

RE: Verizon Wireless Site Located at:

Dear Verizon Wireless Landlord,    604

We write to inform you that Verizon Wireless has performed a radio frequency (RF) compliance evaluation for the above-noted site.

The FCC has established safety guidelines relating to potential RF exposure from cell sites. The FCC developed the standards, known as Maximum Permissible Exposure (MPE) limits, in consultation with numerous other federal agencies, including the Environmental Protection Agency, the Food and Drug Administration, and the Occupational Safety and Health Administration. The FCC provides information about the safety of radio frequency (RF) emissions from cell towers on its website at: http://www.fcc.gov/oet/rfsafety/rf-faqs.html.

To ensure general public safety, it is important that you contact Verizon Wireless personnel at least 24 hours in advance should general maintenance need to be performed in areas where antennas are present. This is required to comply with FCC guidelines and ensure the environment is safe for general maintenance workers who may require RF Safety & Awareness training. With notification, Verizon Wireless is able to evaluate appropriate actions needed relating to the antennas and proximity of the work location.

Please refer to the FCC Office of Engineering and Technology Bulletin 65, Bulletin 56, and the attached Verizon Wireless RF Brochure for information on RF exposure guidelines, RF safety, and landlord responsibilities. Contact your local Verizon Wireless resource below if you have additional questions, or if maintenance is to be performed in an area where Verizon Wireless antennas are present.

| Local Verizon Wireless Contact Name | Phone        |
|-------------------------------------|--------------|
| John Doe                            | 800-888-8888 |

606

In the event that emergency maintenance must be performed on the rooftop and the above-noted contact is not available, please call the Verizon Wireless Network Operations Center at 800-264-6620 for assistance.

Sincerely,

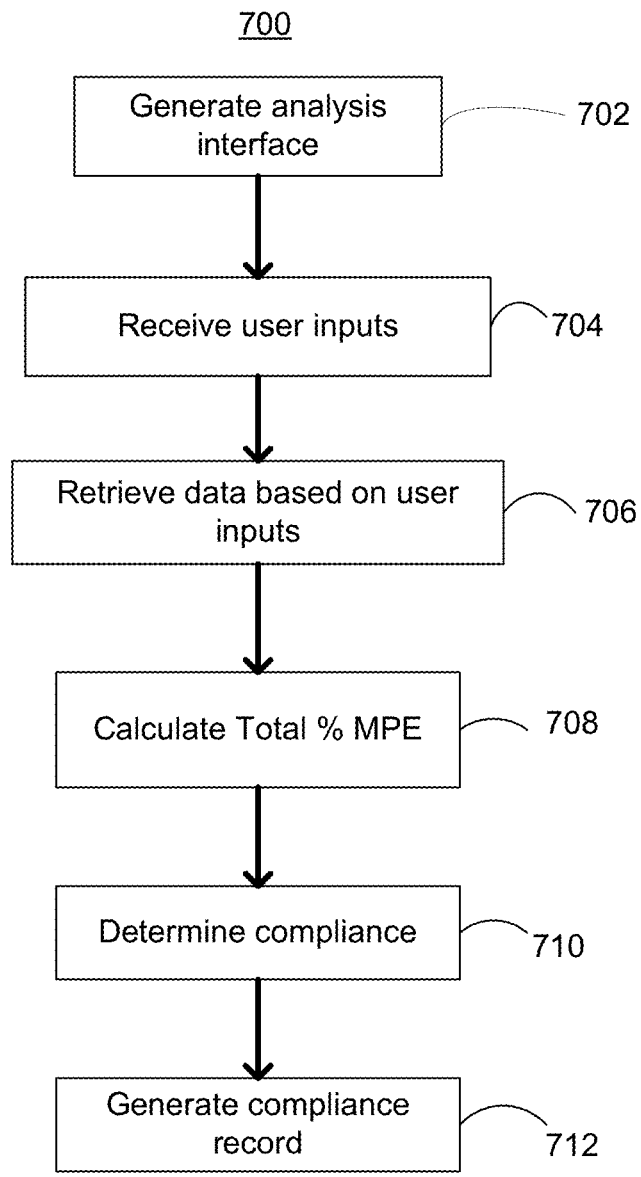

SYSTEMS AND METHODS FOR ANALYZING RADIO FREQUENCY EXPOSURE COMPLIANCE

BACKGROUND INFORMATION

The Federal Communications Commission (FCC) has propagated numerous rules and regulations relating to radio frequency (RF) power-density levels produced by antenna systems. A human cannot be exposed to RF power-density levels in excess of their Maximum Permissible Exposure (MPE) limits. MPE limits may vary depending on the transmission frequency of the RF waves, the type of antenna, and the antennas location relative to the ground. When a utility or telecommunications provider wishes to install a new antenna or RF transmitter, the estimated RF power-density levels must comply with FCC-implemented MPE limits. Currently, it is difficult to account for all RF-emitting components and transmission frequencies at a proposed site.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 3 is an interface for evaluating a proposed transmission site, according to a particular embodiment;

FIG. 6 is a depiction of a landlord letter, according to a particular embodiment; and FIG. 7 is a block diagram illustrating a method according to a particular embodiment.

DETAILED DESCRIPTION OF PREFERRED EMBODIMENTS

Figure 1:
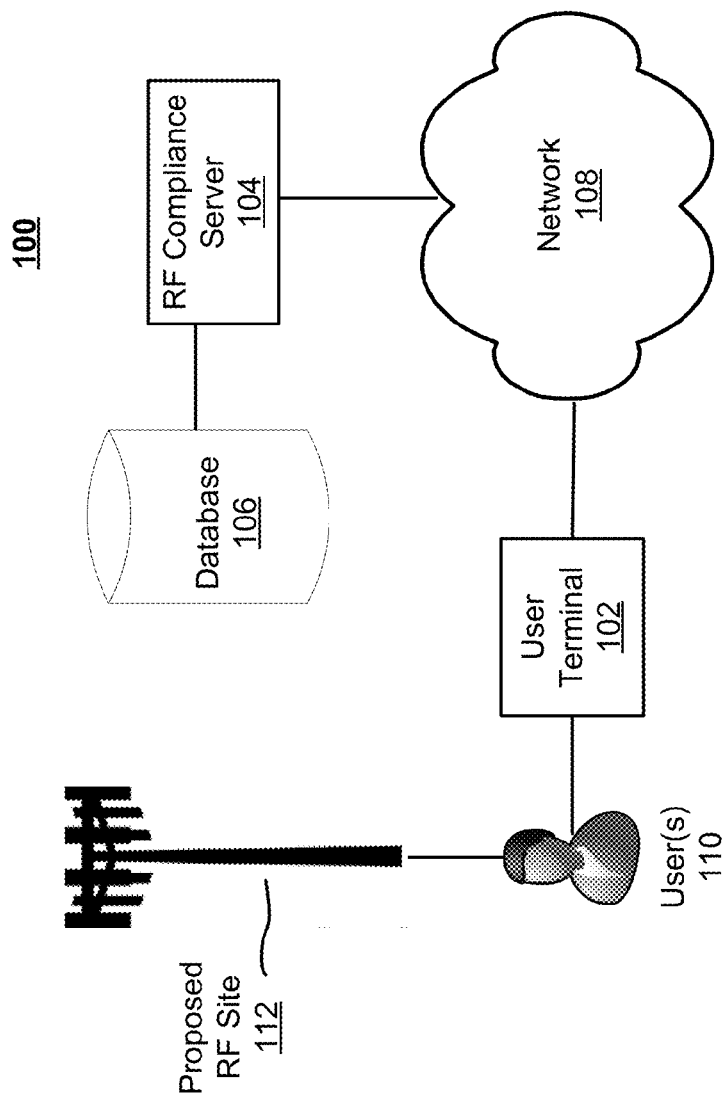
FIG. 1 is a schematic diagram illustrating a system according to a particular embodiment.

A system and method described here may include various embodiments for evaluating a proposed site for an RF transmitting structure to ensure that all RF-emitting components and transmit frequencies are taken into consideration during the evaluation process. The system provides an interface to receive information relating to the proposed structure from a user and/or a previously created file or application. The information may include the structure's location, whether it includes donor or service antennas, the transmission frequency or frequencies that the structure will support, the type of antenna, whether the area is fenced, and specifications related to the antenna(s).

The system may gather additional data based on the inputs. The additional data may be MPE limits, input power, and other information related to the proposed structure. The system may calculate an estimate of the spatially-averaged power density levels (in $mW/cm^2$) a 6-foot human would be exposed to from electromagnetic fields produced by the RF transmitting structure at both the surface level and axis level (antenna elevation) for service antennas, and for donor antennas. The system may then determine the total percentage of the maximum MPE limit that a 6-foot human would be exposed to at both the surface level and axis level for service antennas, and at the axis level for donor antennas.

The system may generate a compliance record based on the determined % MPE limits, and/or based on the inputs to the interface. The compliance record may include an indication of whether the proposed site is approved, conditionally approved, or not approved. The compliance record may include one or more mitigation requirements. Mitigation requirements may include posting signs and warnings, providing notification letters to property owners, and performing more detailed inspections at the site.

The description below describes input modules, data modules, compliance modules, grid report modules, user terminals, compliance servers, databases, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

FIG. 1 is a schematic diagram illustrating a system according to a particular embodiment. A system 100 may include user terminal 102, RF compliance server 104, database 106, a network 108, a proposed RF site 112, and one or more users 110. Although elements of system 100 may be described as a single device, it will be appreciated that multiple instances of these devices may be included in system 100, such as, for example, multiple user terminals, multiple RF compliance servers, multiple RF sites, multiple databases, and multiple networks.

User terminal 102 may be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user terminal 102 may include one or more transmitters, receivers, and/or transceivers to transmit and/or receive one or more signals to and/or from other components depicted in FIG. 1, including, for example, RF compliance server 104 and database 106.

Network 108 may be a wireless network, a wired network, or any combination of wireless network and wired network.

For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, or the like, or any combination thereof. Network 108 may be a 4G network that complies with the International Mobile Telecommunications Advanced (IMT-Advanced) specification. Network 108 may be a Long Term Evolution (LTE) network. Network 108 may be a LTE Advanced (LTE-A) network. Network 108 may be a Mobile WiMAX (IEEE 802.16e). Network 108 may be a Mobile WiMAX Release 2 (IEEE 802.16m) network. Network 108 may further include one, or any number of the exemplary types of networks mentioned above operating as a stand-alone network or in cooperation with each other. Network 108 may utilize one or more protocols of one or more network elements to which it is communicatively coupled. Networks 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

Database 106 may be network accessible storage and may be local, remote, or a combination thereof to the components depicted in FIG. 1. Database 106 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, database 106 may be a database, such as an Oracle database, a Microsoft SQL Server database, a DB2 database, a MySQL database, a Sybase database, an object oriented database, a hierarchical database, or other database. Database 106 may utilize flat file structures for storage of data. Database 106 may be communicatively coupled to RF compliance server 104, or to any other component depicted in FIG. 1. Any of the other components depicted in FIG. 1 may include one or more data storages as well.

RF transmitting structure 112 may be a structure for transmitting RF waves in a communications system. Non-limiting examples of an RF transmitting structure include Distributed Antenna Systems, Small Cells, Tower Structures, and Non-Tower Structures with inaccessible antennas. RF transmitting structure 112 may transmit on one or more communications frequencies. Communications frequencies include 700 MHz, Cellular, Personal Communications Service (PCS), and/or Advanced Wireless Service (AWS). RF transmitting structure 112 may relay transmissions using one or more of these types of communications frequencies. RF transmitting structure 112 may comprise one or more antennas. The one or more antennas may include service antennas or donor antennas. Each of the antennas may transmit communications on the one or more communications frequencies. Service antennas may be mounted on the interior of buildings and transmit on downlink frequencies. Service antennas may provide service to mobile units on the inside of buildings. Donor antennas are mounted on the exterior of a building and transmit on uplink frequencies. They serve as a form of transport for in-building systems that do not have a base station.

RF compliance server 104 may include one or more devices, modules, and/or components for providing routing information for transmitting data over a network, such as, for example, an IP network and/or a PSTN. RF compliance server 104 may include one or more computer systems and/or processors to provide an interface for evaluating a proposed RF site and determining whether it complies with MPE exposure limits. RF compliance server 104 may include an interface module, a data module, a compliance module, and a report module as described herein in reference to FIG. 2. In other embodiments, RF compliance server 104 may be implemented locally as an application on user terminal 102. RF compliance server 104 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device.

Figure 2:
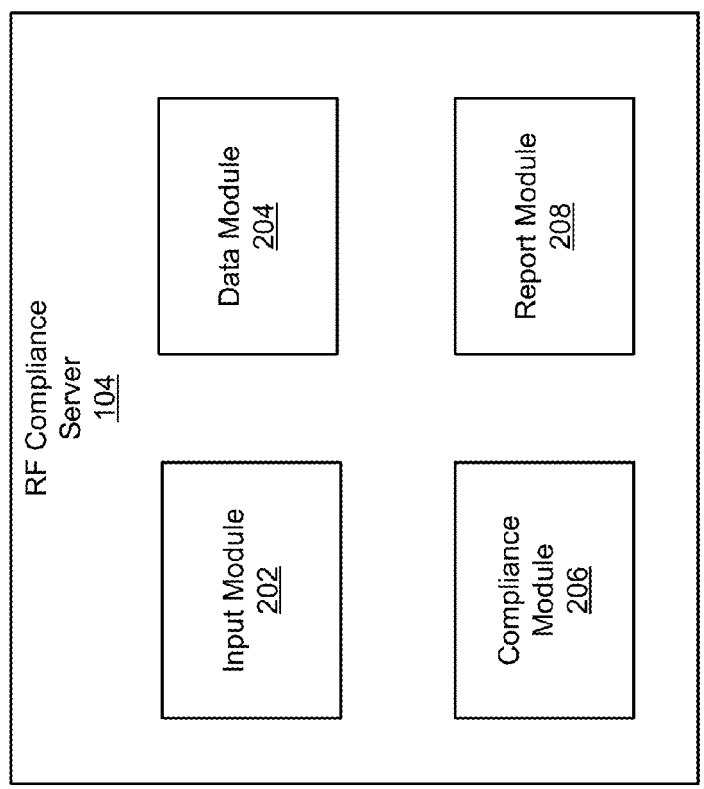
FIG. 2 is a schematic diagram of a hardware component of the system of a particular embodiment.

FIG. 2 is a block diagram of a hardware component of an exemplary embodiment of RF compliance server 104, which may include an interface module 202, a data module 204, compliance module 206, and report module 208. It is noted that modules 202, 204, 206, and 208, are exemplary and the functions performed by one or more of the modules may be combined with that performed by other modules. The functions described herein as being performed by modules 202, 204, 206, and 208 may also be separated and may be performed by other modules at devices local or remote to RF compliance server 104. The modules may each be a computer program or an appropriately programmed computer, such as a mainframe or personal computer, or may include a plurality of such computers cooperating to perform the functionality described herein. Modules 202, 204, 206, and 208 may also communicate with database 106. Modules 202, 204, 206, and 208 may also be coupled to or integrated with RF compliance server 104. For example, modules 202, 204, and 208 may be external devices that are wirelessly coupled and/or communicatively coupled to RF compliance server 104 via an interface port which may include, without limitation, USB ports, system bus ports, or Firewire ports and other interface ports. Further, computer code may be installed on RF compliance server 104 to control and/or operate a function of interface module 202, category module 204, selection module 206, and/or grid module 208.

Interface module 202 may generate an RF compliance interface on user terminal 102. Interface module 202 may receive inputs from user terminal 102 via the RF compliance interface. An embodiment of RF compliance interface 300 is shown in FIG. 3. Interface 300 will be referenced throughout the application. User 110 may enter information related to proposed RF site 112 into interface 300 at user terminal 102. Referring to FIG. 3, information may include site name 304 and site address 306. The site address 306 may include the street, city, state, country, etc. for the proposed RF site 112. Information may include the project type 308. Project type may refer to the type of RF transmitting structure. The RF transmitting structure may be a donor antenna or a service antenna. The structure may be located indoors or outdoors. Possible indoor structures include, without limitation, (1) accessible donor antennas with a bi-directional amplifier; (2) inaccessible donor antennas with a bi-directional amplifier; and (3) indoor antennas fed by a full Base Transceiver Station (BTS-FED). Possible outdoor structures include, without limitation, (1) Cell on Wheels (COW)/Cell on Light Truck (COLT)/Repeater on a Truck (RAT); (2) tower structure; and (3) non-tower structure with an inaccessible antenna. The user may select the project type 308 from a drop-down list. A tower structure may be any structure built for the sole purpose of supporting telecommunications equipment (e.g. monopoles, stealth flagpoles, guyed towers, lattice towers). A non-tower structure with inaccessible antennas may include any support structure not designed/built to support telecommunications equipment. The "inaccessible" part means that there are no permanent means of access to areas in which the power density of the RF emissions from transmitting antennas are likely to exceed the FCC General Population MPE limit. A COW/COLT is a portable tower structure; antennas mounted on a mast and base station equipment is mounted on a truck. A repeater on a truck is very similar to a COW/COLT but without the base station—a repeater (aka donor antenna) and bi-directional amplifier are mounted on a mast that's mounted on a truck.

Compliance interface 300 may include an interactive box 310 related to whether the proposed RF site 112 is a multi-licensee facility. A multi-licensee facility refers to a site where more than one service provider has an RF transmitting component installed at the site. A user may select "yes" or "no" from a drop-down list. If the proposed site is a multi-licensee facility, the proposed RF transmitting structure is required by law to contribute not more than a certain percentage of the MPE exposure limit in accessible areas for the site 112. In one embodiment, this percentage may be 5%. This will be explained in greater detail in reference to compliance module 206 and report module 208.

The inputted information may include whether the proposed RF site 112 includes a high-power broadcast (AM/FM/TV) collocator (box 312). The user may select "yes" or "no" from a drop-down list. If the user selects "yes", compliance module 206 may only give "Conditionally Approved" or "Not Approved" in box 388, as described below (i.e., compliance module 206 will not give "Approved" in box 388).

The inputted information may include whether there is an existing/future fence around the base of the proposed RF site 112 (box 314). The user may select "yes" or "no" from a drop-down list. Information may include the projected in-service date (box 316). If the user selects yes, the higher-tier Occupational MPE limits will be applied by compliance module 206 (instead of the usual General Population MPE limits). The user may input the date at box 316. Input module 202 may receive the user's inputs.

If the proposed RF transmitting structure 112 includes a service antenna, user 110 may input information into boxes 318-336 (as shown in FIG. 3). If the proposed RF transmitting structure 112 includes a donor antenna, user 110 may input information into boxes 344-358. For each of the service antenna and donor antenna, the box where the user 110 inputs information depends on the type of communication system associated with the antenna. In one embodiment, a 700 MHz LTE communication system may have a minimum transmit frequency of 746 MHz. A Cellular CDMA communication system may have a minimum transmit frequency of 850 MHz. A PCS CDMA communication system may have a minimum transmit frequency of 1900 MHz. An AWS LTE system may have a minimum transmit frequency of 2100 MHz. Other embodiments may use other transmit frequencies for each communication system. An RF transmitting structure may be associated with one or more of the aforementioned communications systems.

Figure 4:
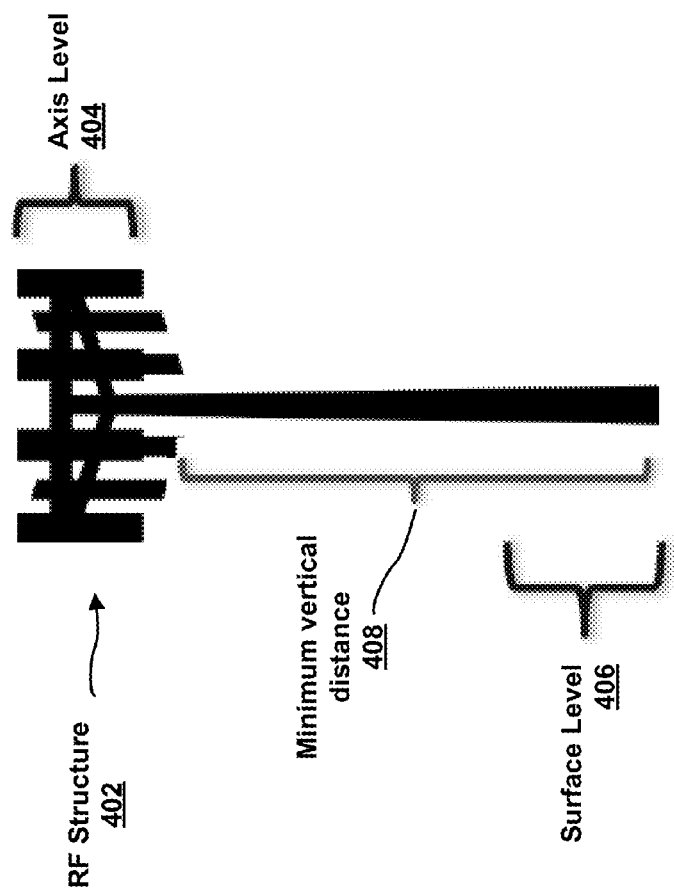
FIG. 4 is a depiction of a service antenna, according to a particular embodiment.

As shown in FIG. 3, for each transmission frequency (746 MHz, 850 MHz, 1900 MHz, and 2100 MHz), the user 110 may input information into a corresponding box. This data is then provided to RF compliance server 104 via input module 202. User 110 may input the antenna manufacturer in column 318, and the antenna model in column 320. In column 322, user 110 may enter the max antenna dimension. The max antenna dimension may be the length of the antenna. In this embodiment, the max antenna dimension is measured in feet. In column 324, the user 110 may provide the power per transmitter for each communications frequency. This may be measured in watts. In column 326, the user 110 may provide the number of transmitters that will be used on the RF transmitting structure 112 for each communications frequency. Column 328 allows user 110 to provide the expected total loss per band due to any normal source attenuation (e.g., coaxial cable, connector, diplexer, etc.). Power loss may include line loss and/or connector loss that reduces the power going to the antenna. In column 330, the user 110 may input the distance between the nearest accessible walking surface and the bottom of the lowest antenna on the RF transmitting structure 112 for each communications frequency. The distance may be measured in ft, for example. FIG. 4 shows an embodiment of an RF transmitting structure 402. The RF structure 402 in FIG. 4 is a service antenna. The minimum vertical distance 408 is shown, which user 110 may measure him or herself, or retrieve from a third-party source.

In column 332, user 110 may provide the horizontal beamwidth for the antenna for each communications frequency. The horizontal beamwidth may be measured in degrees, for example. In column 334, user 110 may provide the antenna gain for each communications frequency. The gain may be expressed in dBd, for example.

In various embodiments, the data in boxes 304-316 and columns 318, 320, 322, 324, 326, 328, 330, 332, and/or 334 may be automatically populated based on the user selecting import data option 302b and/or by importing the data from one or more previously-created files. The data may have been previously created by an engineer and/or crew that set up RF transmitting site 112 and/or plans to set up RF transmitting site 112. The data may be stored in database 106.

If the RF transmitting structure 112 includes a donor antenna, the user may supply the manufacturer in column 344 and the model in column 346 (similar to columns 318 and 320). The donor type in column 348 may be selected by the user from a drop-down menu. In various embodiments, the donor type may be entered by the user. The maximum antenna dimension in column 350 may be provided by the user 110 (similar to column 322). The user 110 may provide the total input power in column 352. This may be measured in Watts, for example. In column 354, the user 110 may provide the distance between the nearest walking surface and the bottom of the lowest donor antenna on the RF transmitting structure 112. If the RF transmitting structure 112 is on a roof, then the nearest walking surface would be the rooftop. The distance may be measured in ft (similar to column 330 in FIG. 3). In column 356, user 110 may provide the horizontal beamwidth for the donor antenna. The horizontal beamwidth may be measured in degrees. In column 358, user 110 may provide the antenna gain for the donor antenna. The gain may be expressed in dBd. The gain may be expressed in dBi. All of the inputs may be received by input module 202.

Data module 204 may provide data for columns 336 and 338. The total power for a service antenna for each communications system may be stored in database 106. Data module 204 may automatically populate interface 300 with the values for the total power (in W) for each communications frequency on the service antenna. This value may be provided in the relevant boxes in column 336. For an LTE communications system, the total input power may be 10.0 W. Data module 204 may provide the data for column 338. The relevant values may be stored in database 106. The power density limit for each communications system (700 MHz LTE, Cellular CDMA, PCS CDMA, and AWS LTE) is calculated based on FCC OET Bulletin 65. The General Population power density limit (MPE limit) is measured in mW/cm$^2$ and reflects the limit set by law for the power density level that a 6-foot human may be exposed to for that communications frequency. For a 700 MHz LTE communication system (transmit frequency of 746 MHz), the MPE limit is 0.4973 mW/cm$^2$. For a Cellular CDMA communication system (transmit frequency of 850 MHz), the MPE limit is 0.567 mW/cm$^2$. For both a PCS CDMA communication system (transmit frequency of 1900 MHz) and an AWS LTE communication system (transmit frequency of 2100 MHz), the MPE limit is 1 mW/cm$^2$.

Compliance module 206 may calculate the Max % MPE surface-level (column 340) and Max % MPE axis-level (column 342) for the service antenna for each applicable communications frequency on the RF structure at RF site 112, based on the values in the corresponding row of columns 318-338. The value of the Max % MPE surface-level (column 340) represents the maximum spatially-averaged percentage of the MPE limit that a 6-foot person would be exposed to on the nearest walking surface near the antenna (e.g., at surface level 406 in FIG. 4). The value of the Max % MPE axis-level (column 342) represents the maximum spatially averaged percentage of the MPE limit that a 6-foot person would be exposed to if their body is in close proximity (~1 ft) of the main beam of the antenna at the axis level (e.g., at axis level 404 shown in FIG. 4). Compliance module 206 may use one or more equations to determine the spatially-averaged power-density levels. The values at 340 and 342 are based on conservative near-field and fair-field equations specified in FCC OET bulletin 65, which is incorporated herein by reference. The near-field power density, $S_{Near-Field}$, may be calculated based on the total input power for the antenna, the horizontal beam width, and the length of the antenna (measured in cm). The far-field power density, $S_{Far-Field}$, may be calculated based on a spatial-averaging coefficient, the antenna far-field numeric gain (in dB), and the distance from the antenna. The spatial-averaging coefficient is added to the equation to reduce peak power density.

Compliance module 206 may calculate the Max % MPE Axis-level (column 362) for the donor antenna for each applicable communications system on the RF structure 112, based on the values in the corresponding row of columns 344-360. The Max % MPE Axis-level in column 362 may represent a measurement similar to the one in column 342 above (except for a donor antenna instead of a service antenna). Compliance module 206 may provide results in boxes 364, 366, and 368, under the "RF Compliance Summary" Section. Box 364 may represent the sum of all the rows in column 340 (Total % MPE at the surface-level for the service antenna). Box 366 may represent the sum of all the rows in column 342 (Total % MPE at the axis-level of the service antenna). Box 368 may represent the sum of all the rows in column 362 (Total % MPE at the axis-level for the donor antenna).

In one example, if the result in box 364 is 3.44, this means that a 6-foot person walking on the nearest walking surface below the service antenna on the RF structure would be exposed to 3.44% of the maximum permissible power density level. If the result in box 366 is 316.28, this means that a 6 foot-person within 1 foot of the service antenna at its axis level would be exposed to 316.28% of the maximum permissible power density level.

In box 388, compliance module 206 may generate an RF compliance determination. The compliance determination may be one of "Not Approved," "Conditionally Approved," or "Approved." A "Not Approved" determination means that the RF site 112 either needs to be re-designed or a third party consultant evaluation is required. Compliance module 206 may determine the RF compliance based on one or more of the Total % surface-level MPE (box 364) (if the site includes a service antenna), total % axis-level MPE (box 366) (if the site includes a service antenna), total % MPE for a donor antenna (box 368), whether the site is a multi-licensee facility (box 310), whether the site has a fence around the base (box 314), and/or the project type (box 308). For example, if the total % MPE in box 364 is greater than 100%, compliance module 206 may generate "Not Approved" in box 388. If box 310 is selected as "yes" (e.g., the RF site is a multi-licensee facility), and box 364 is greater than 5%, compliance module 206 may generate a "Not Approved" determination in box 388. In that case, the site must be evaluated to determine whether the Total % MPE generated each of the other licensees at the proposed site. If compliance module 206 determines that the configuration would exceed FCC limits in areas frequented by the public (e.g. on the inside of a building or sidewalk), then the site will not be approved and an engineer will be forced to re-design the configuration until the power density levels have been reduced below FCC limits.

A "Conditionally Approved" determination means that the site 112 requires some post-construction mitigation and the site is determined to be one that can be controlled by the operator. Mitigation options are shown in columns 370-386. Mitigation options include hot spot (370), RF re-design (372), consultant evaluation (374), a notice (376), a caution sign (378), a warning sign (380), posted guidelines (382), an information sign (384), and a landlord letter (386). An "Approved" determination means the site 112 is intrinsically compliant, and no post-construction mitigation is required. A site may be approved when there are no other transmitters at the proposed site and the RF emissions are not predicted to exceed FCC limits for the general population in accessible areas. A site may also be approved (if it is multi-licensee) if the RF emissions are not predicted to exceed 5% of the MPE in accessible areas.

If RF site 112 has a service antenna, and compliance module 206 determines that the total % surface-level MPE (box 364) is greater than a first threshold, compliance module 206 may give the RF site a "Conditionally Approved" compliance determination in box 388. Compliance module 388 may require a notice (box 376). The first threshold may be a total % surface level MPE that exceeds a limit for the general public, but not an occupational limit (as set by the FCC). If compliance module 206 determines that the total % surface-level MPE (box 364) is greater than a second threshold, compliance module 206 may give the RF site a "Conditionally Approved" compliance determination in box 388 and may require a caution sign (box 378). The second threshold may be the occupational limit for the total % surface level MPE, as determined by the FCC. If compliance module 206 determines that the total % surface-level MPE (box 364) is greater than a third threshold, compliance module 206 may give the RF site a "Conditionally Approved" compliance determination in box 388 and may require a warning sign (box 380). The third threshold may be at least 10 times the FCC occupational MPE limit. If any one of a notice sign 376, a caution sign 378, or a warning sign 380 is required, the user (or some third party) must place the sign at least one of the following locations on RF site 112: 1) within a certain distance of an antenna node (if the project type 308 is an ODAS/small cell); 2) on the fence at the base of a tower or non-tower structure (if applicable); and/or 3) within a certain distance of an accessible donor antenna and all access points. This is dependent on site-specific characteristics. For example, if the FCC limit is exceeded within 5 feet of the antenna, user 110 may need to place a sign 5 feet away.

If compliance module 206 indicates in column 370 that the hotspot check is "Required," a service technician must walk in or access areas near RF site 112 with a personal RF monitor to determine if any areas exceed the general population MPE limit. A hotspot check may be required when one or more antennas are located on the same support structure as high-power broadcast systems (AM/FM/TV stations). In various embodiments, compliance module 206 may set box 370 at "Required" if box 312 was selected as "yes".

Compliance module 206 may check box 386 (landlord letter) if compliance module 206 determines that the proposed RF site 112 may be subject to maintenance by someone in the general public (based on the address information supplied in box 306). If box 386 is checked, report module 208 may generate a landlord letter. An embodiment of a landlord letter 600 is shown in FIG. 6. The letter may include the address 602 of the proposed site. The body 604 may include contact information 606 for the service provider that is setting up and/or maintaining the RF site 112.

Figure 5:
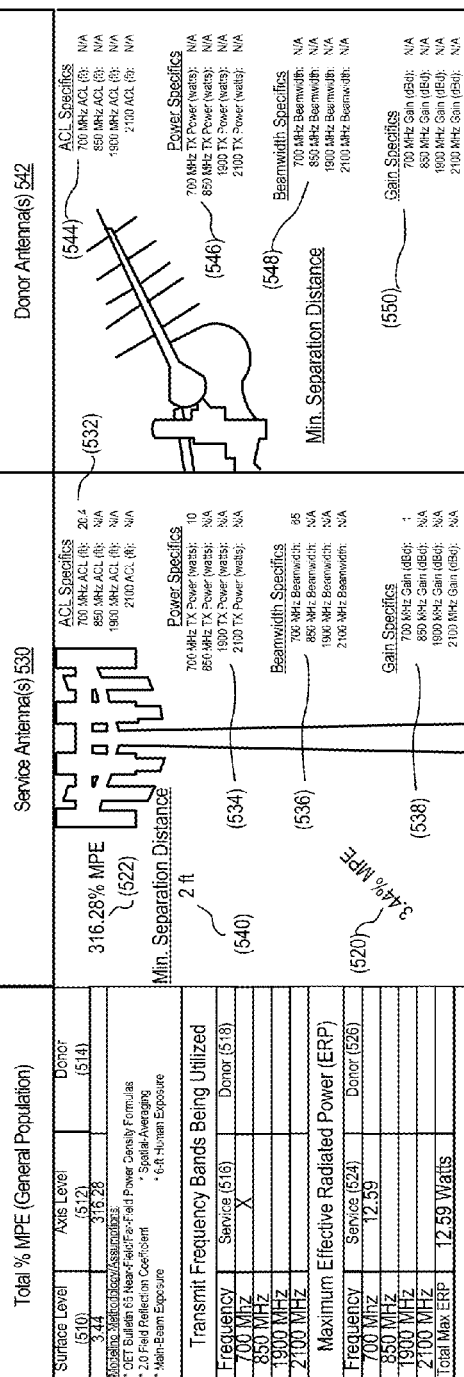
FIG. 5 is a depiction of a compliance record, according to a particular embodiment.

User 110 may request a compliance record by clicking button 392 ("Generate Record of RF Compliance"). The compliance record may be generated by report module 208 in response to the user request. An embodiment of a compliance record 500 is shown in FIG. 5. In various embodiments, the report module 208 may not generate a compliance record unless user 110 inputs all of the required information into RF compliance interface 300. Compliance record 400 will be explained in conjunction with FIG. 7.

FIG. 7 is a flowchart illustrating the functionality of a method according to an embodiment of the disclosure. This method is provided by way of example, as there are a variety of ways to carry out the methods described herein. Method 700 shown in FIG. 7 may be executed or otherwise performed by one or a combination of various systems. The method 700 may be carried out through system 100 of FIG. 1, the one or more modules shown in FIG. 2, and/or compliance analysis tool 300 shown in FIG. 3, by way of example, and various elements of FIG. 1, FIG. 2, and FIG. 3 are referenced in explaining method 700 of FIG. 7. Each block shown in FIG. 7 represents one or more processes, methods, or subroutines carried out in method 700. Method 700 may begin at block 702.

At block 702, method 700 may generate a compliance interface. An embodiment of the interface 300 is shown in FIG. 3. The interface may be a GUI where a user can provide inputs that include data related to a proposed RF site. At block 704, method 700 may receive user inputs. In one example, the user may be an engineer who is providing inputs for a proposed RF site. The user may provide a name for the site (box 304). In this example, the name is "SMALL CELL_1". The user may provide the physical address for the site (box 306), including the street, city, state, and/or zip code. In this example, the address may be near 1234 Grapevine St, Grapevine, Tex. The user may select a project type (box 308). The project type may be selected from a drop-down menu. In this example, RF site may be an outdoor, pole-mounted Distributed Antenna System (DAS)/Small cell. The user may select Outdoor: Pole-Mounted DAS/Small cell in box 308. The user may indicate whether the site is a multi-licensee facility (box 310). In this example, the site will only be used by a single service provider, and the user may select "NO" in box 310. The user may indicate whether the site has high-power broadcast (AM/FM/TV) co-locators (box 312). In this example, the site will not include this equipment, and the user may indicate "NO" in box 312.

The user may indicate whether there is an existing fence and/or future fence around the structure in box 314. In this example, the proposed site does not include an existing fence, and there may not be any plans to build one in the future, and thus the user may select "NO" in box 314. In some embodiments, if the user selected an "Indoor" project type, this box may automatically be populated as "NO" by compliance module 206 and/or data module 204. The user may indicate the projected in-service date in box 316. In this example, the projected in-service date is Aug. 20, 2014.

The user may provide data relating to the antennas that will be installed at the proposed RF site. Antennas may include service antennas and/or donor antennas. Data relating to service antennas may be provided in columns 318-334. Data relating to donor antennas may be provided in columns 344-358. In this example, the proposed site has a service antenna that will only be transmitting 700 MHz LTE, which has a transmit frequency of 746 MHz in this example. At box 318, the user may provide the antenna manufacturer for this bandwidth. At box 320, the user may provide the antenna model for this bandwidth. At box 322, the user may provide the maximum antenna dimension in feet. In this example, the maximum dimension may be the length of the antenna, which is 0.8 feet. In box 324, the user may provide the power per transmitter. In this example, the power per transmitter is 5 W. In box 326, the user may provide the number of transmitters, which in this example is 2. In box 328, the user may provide the loss in dB. In this example, the loss may be 0 dB. In box 330, the user may provide the distance from the bottom of the lowest antenna to the nearest walking surface. In this example, the distance is 20.0 ft. between the lowest service antenna and the ground at the proposed RF site "SMALL_CELL_1".

At block 706, method 700 may retrieve data based on user inputs. The data may be provided by a third party source, for example, the FCC. The data may include total input power (shown in box 336) and FCC General Population MPE limit (shown in box 338). The total input power may be retrieved based on one or more of the inputs in boxes 318-334. A database or third party source may keep a record of the input power for a donor antenna with the specifications provided in 318-334 for each transmission frequency. In this example, for the service antenna transmitting at 746 MHz with the dimensions and specifications provided in boxes 318-334, the total input power is 10.00 watts. Compliance module 206 may populate this info in box 336. Compliance module 206 may populate the FCC MPE limit in box 338. This number may be based on the inputs in boxes 318-334, and boxes 308-314. In this example, the user selected "NO" in box 314, indicating that there is no fence around the base of the existing structure, which means that individuals may walk directly beneath the structure. Based on this input, compliance module 206 may retrieve the general population MPE limit of 0.4973 $MW/cm^2$, which is the general limit for the 746 Hz transmission frequency at the service antenna of the proposed RF site. This is the maximum power density level averaged across the body that a six foot human may be exposed to from the service antenna. If the user selected "YES" in box 314 (indicating that there was a fence around the base of the structure, then the compliance module 206 may retrieve the occupational MPE limit for that transmission frequency. In various embodiments, the occupational MPE limit may be 5 times greater than the general population MPE limit.

At block 708, method 700 may calculate the Max % MPE at the surface-level and axis-level for each transmission frequency of each service antenna, as well as the Max % MPE at the axis-level for each transmission frequency of each donor antenna at the proposed site. For each transmission frequency on the service antenna, the surface level max % MPE may be calculated based on the surface level power density as a percent of the maximum power density limit (in box 338). Compliance module 206 may calculate the surface level power density for the service antenna based on the inputs in one or more of boxes 318-336. Compliance module 206 may then divide this number by the FCC MPE limit in box 338 to determine the max % MPE for the surface level. For each transmission frequency on the service antenna, the axis-level max % MPE may be calculated based on the axis-level power density as a percentage of the maximum power density limit (in box 338). The surface-level power density and axis-level power density may be calculated based on one or more equations that were previously provided to compliance module 206. The inputs for the one or more equations may include the data in boxes 318-336. In this example, the surface level max % MPE may be 3.44% for the 700 MHz LTE transmission frequency. The axis-level max % MPE may be 316.28% for the 700 MHz LTE transmission frequency.

The total % surface level MPE for the service antenna may then be determined by adding up the max % surface level MPE for each transmission frequency. In this example, because the service antenna at the proposed site will only include LTE transmissions, the total % surface level MPE is 3.44%. This value may be populated in box 364. The total % axis-level MPE for the service antenna may then be determined by adding up the max % axis-level MPE for each transmission frequency. In this example, because the service antenna at the proposed site will only include 700 MHz LTE transmissions, the total % axis-level MPE is 316.28%. This value may be populated in box 366. The same steps may be taken for the donor antenna, as previously described.

At block 710, method 700 may determine compliance, based on the total % MPE at the surface-level and axis-level for service antennas as well as the data in boxes 304-342, and the total % axis-level MPE for the donor antennas as well as data in boxes 304-316 and 344-362. In this example, based on the total % surface-level MPE of 3.44% and the total % axis-level MPE of 316.28% for the service antenna at the proposed site, compliance module 206 may determine that the site is conditionally approved. This result may be provided in box 388. Because the site is conditionally approved, compliance module 206 may generate one or more mitigation requirements. In this example, the RF site must include a posted Notice (box 376) and a landlord letter (box 386).

At block 712, method 700 may generate a compliance record. This may be based on the user selecting option 392 (in FIG. 3). An embodiment of a compliance record is shown in FIG. 5. The compliance record may include at least some of the data entered in the compliance interface tool in FIG. 3. Continuing with the previous example, the compliance record 500 shown in FIG. 5 includes the compliance determination 502. Continuing with the previous example, the proposed RF site has been "conditionally approved." The compliance determination 502 is based on the resulting surface level total % MPE for the service antenna (in box 510), the axis level total % MPE for the service antenna (in box 512), and the axis level total % MPE for the donor antenna (in box 514) (if applicable). In this example, these values have been populated by report module 208 into compliance record 500 based on the results from block 710. The compliance determination 502 may be based in part on the information from boxes 304-316 (for both service and donor antennas), the information from boxes 318-342 (for service antennas) and/or the information from boxes 344-362 (for donor antennas). The compliance determination may be "Not Approved," "Conditionally Approved," or "Approved," as discussed previously.

The compliance record 500 may include site information (504). This corresponds to the information provided in boxes 304-316 in the compliance analysis tool 300 shown in FIG. 3. The compliance record may include Surface Level total % MPE in box 510 for the service antenna, which was calculated and provided in box 364 in FIG. 3. In this example, the surface level total % MPE is 3.44%. The compliance record may include Axis Level total % MPE in box 512 for the service antenna, which was calculated and provided from block in box 366 in FIG. 3. In this example, the axis level total % MPE is 316.28%. The compliance record may include Axis Level total % MPE in box 514 for the donor antenna, which was calculated and provided from in box 368 in FIG. 3. In this example, there is no donor antenna, and there is no value provided.

Compliance record 500 may include information about the transmission frequency bands being utilized. In column 516, compliance module 206 may "check" the box next to each transmission frequency band utilized on the service antenna of the proposed RF site. In this example, the only transmission frequency band being utilized is 700 MHz (in this case, the frequency is 746 MHz). In column 518, compliance module 206 may "check" the box next to each transmission frequency band being utilized on the donor antenna of the proposed RF site. In this example, there is no donor antenna, and thus none of the boxes are checked.

Compliance record 500 may include information about the maximum effective radiated power (ERP) for each frequency band being utilized on the service antenna and donor antenna. The maximum ERP may be calculated in column 524 for each transmission frequency on the service antenna. The maximum ERP may help the user determine whether or not the configuration would be Categorically Excluded (from performing routine evaluations of compliance) by the FCC. The FCC bases categorical exclusion on ERP and the location of the antennas. In this example, the only transmission frequency on the service antenna is 700 MHz, which may be calculated as 12.59 Watts. The total max ERP is 12.59 Watts in this example. The maximum ERP may be calculated in column 526 for each transmission frequency on the donor antenna. In this example, there is no donor antenna, and thus column 526 is left blank.

Compliance record 500 may include service antenna information 530. The service antenna information may include the axis level total % MPE 522 (which in this example is 316.28%). The service information may include the surface level total % MPE 520 (which in this example is 3.44%). The service information may include ACL specifics 532, where ACL measures the distance from the walking surface to the antenna center line (ACL). In this example, the ACL for the service antenna for the 700 MHz transmission frequency is 20.4 ft. This number may later be used to calculate surface level and/or axis level % MPE. The service information may include power specifics 534. In this example, the input power for the service antenna for the 700 MHz transmission frequency is 10.0 Watts (as provided in box 336 in FIG. 3). The service information may include the beamwidth specifics 536. In this example, the beamwidth specifics for the service antenna for the 700 MHz transmission frequency is 65 degrees (as provided in box 332 in FIG. 3). The service information may include the gain specifics 538. In this example, the gain specifics for the service antenna for the 700 MHz transmission frequency is 1 dBd (as provided in box 334 in FIG. 3). Compliance record 500 may include minimum separation distance 540 for the service antenna. This may be the minimum distance from any part of the antenna. This distance may be provided on compliance diagrams associated with the antenna. In this example, the minimum separation distance for the service antenna may be 2 ft.

The compliance record 500 may include donor antenna information 542. The donor antenna information may include the axis level total % MPE (which in this example is not displayed because there is no donor antenna on the proposed site). The donor antenna information may include ACL specifics 544, where ACL measures the distance from the walking surface to the antenna center line (ACL). The donor antenna information may include power specifics 546. The donor antenna information may include beamwidth specifics 548. The donor antenna information may include gain specifics 550. In this example, all the measurements are listed as N/A because there is no donor antenna on the proposed RF site. There is no minimum separation distance for the same reason.

The compliance record 500 may include the compliance requirements table 528. This may include mitigation measures. These may be based on the compliance determination 502, the values provided in boxes 304-316 (for either donor or service antennas), the values provided in boxes 318-338 (for service antennas), the calculated results in boxes 364 and 366 (for service antennas), the values provided in boxes 344-360 (for donor antennas), and/or the calculated results in box 368 (for donor antennas). In this example, based on these inputs and results, as previously described above, the mitigation requirements table 528 may include a Notice requirement and a landlord letter requirement for the service antenna at the proposed RF site. The compliance record 500 may be provided to a user device (e.g., a network enabled computer), either locally or over a network.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, such as the data storage 120, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising:
   a processor; and
   a memory comprising computer-readable instructions which when executed by the processor cause the processor to:
      provide an interface for display on a screen of a user terminal;
      receive, from the user terminal, first data related to a proposed radio frequency transmission site and second data related to an antenna of the proposed radio frequency transmission site;
      retrieve at least one of a power density limit and a power input level based on the first data and the second data;
      calculate at least one percentage of a maximum power density limit;
      determine whether the proposed radio frequency transmission site is one of approved, conditionally approved, or not approved based at least in part on the maximum power density limit;
      generate a compliance record comprising the determination related to the proposed radio frequency transmission site; and
      transmit the compliance record to a user device over a network.

2. The system of claim 1, wherein the first data related to the proposed radio frequency transmission site includes at least one of a site location, a type of antenna associated with the proposed radio frequency transmission site, an indication of whether the proposed radio frequency transmission site is a multi-licensee facility, an indication of whether a fence is in place at the proposed radio frequency transmission site, and an indication of whether the proposed radio frequency transmission site includes one or more high-power broadcast collocators.

3. The system of claim 2, wherein the type of antenna is one of a service antenna or a donor antenna.

4. The system of claim 1, wherein the antenna of the proposed radio frequency transmission site transmits at at least one frequency band, wherein the at least one frequency band is 700 MHz, Cellular, PCS, and AWS.

5. The system of claim 4, wherein the power density limit is based on the at least one frequency band, wherein the power density limit for LTE is 0.4973 mW/cm$^2$, wherein the power density limit for cellular is 0.567 mW/cm$^2$, and wherein the power density limit for PCS and AWS is 1 mW/cm$^2$.

6. The system of claim 5, wherein calculating the at least one percentage of the maximum power density limit comprises, for a service antenna:
   calculating a surface level power density for each frequency band;
   determining a surface-level percentage of the maximum power density limit based on the surface level power density as a percentage of the maximum power density limit for each frequency band;
   determining a total surface-level percentage of the maximum power density limit by adding the surface level power density as a percentage of the maximum power density limit for each frequency band;
   calculating an axis level power density for each frequency band;
   determining an axis-level percentage of the maximum power density limit based on the surface level power density as a percentage of the maximum power density limit for each frequency band; and
   determining a total axis-level percentage of the maximum power density limit by adding the surface level power density as a percentage of the maximum power density limit for each frequency band.

7. The system of claim 6, wherein determining whether the proposed radio frequency transmission site is one of approved, conditionally approved, or not approved based at least in part on the maximum power density limit comprises:
   if the total surface-level percentage is less than a first threshold, the proposed radio frequency transmission site is approved;
   if the total surface-level percentage is greater than the first threshold but less than a second threshold, the proposed radio frequency transmission site is conditionally approved subject to one or more mitigation requirements; and
   if the total surface-level percentage is greater than the second threshold, the proposed radio frequency transmission site is not approved.

8. The system of claim 7, wherein the one or more mitigation requirements include at least one of a posted sign, an on-site inspection, an on-site power density reading, a redesign of the proposed radio frequency transmission site, and a landlord letter.

9. The system of claim 5, wherein calculating the at least one percentage of the maximum power density limit comprises, for a service antenna:
   calculating an axis level power density for each frequency band;
   determining an axis-level percentage of the maximum power density limit based on a surface level power density as a percentage of the maximum power density limit for each frequency band; and
   determining a total axis-level percentage of the maximum power density limit by adding the surface level power density as a percentage of the maximum power density limit for each frequency band.

10. A method, comprising:
   providing an interface for display on a screen of a user terminal;
   receiving, from the user terminal, first data related to a proposed radio frequency transmission site and second data related to an antenna of the proposed radio frequency transmission site;
   retrieving, using a computer processor, at least one of a power density limit and a power input level based on the first data and the second data;

calculating, using the computer processor, at least one percentage of a maximum power density limit;

determining, using the computer processor whether the proposed radio frequency transmission site is one of approved, conditionally approved, or not approved based at least in part on the maximum power density limit;

generating, using the computer processor, a compliance record comprising the determination related to the proposed radio frequency transmission site; and transmitting the compliance record to a user device over a network.

11. The method of claim 10, wherein the first data related to the proposed radio frequency transmission site includes at least one of a site location, a type of antenna associated with the proposed radio frequency transmission site, an indication of whether the proposed radio frequency transmission site is a multi-licensee facility, an indication of whether a fence is in place at the proposed radio frequency transmission site, and an indication of whether the proposed radio frequency transmission site includes one or more high-power broadcast collocators.

12. The method of claim 11, wherein the type of antenna is one of a service antenna or a donor antenna.

13. The method of claim 10, wherein the antenna of the proposed radio frequency transmission site transmits at least one frequency band, wherein the at least one frequency band is 700 MHz, Cellular, PCS, and AWS.

14. The method of claim 13, wherein the power density limit is based on the at least one frequency band, wherein the power density limit for LTE is 0.4973 mW/cm$^2$, wherein the power density limit for cellular is 0.567 mW/cm$^2$, and wherein the power density limit for PCS and AWS is 1 mW/cm$^2$.

15. The method of claim 14, wherein calculating the at least one percentage of the maximum power density limit comprises, for a service antenna:

calculating a surface level power density for each frequency band;

determining a surface-level percentage of the maximum power density limit based on the surface level power density as a percentage of the maximum power density limit for each frequency band;

determining a total surface-level percentage of the maximum power density limit by adding the surface level power density as a percentage of the maximum power density limit for each frequency band;

calculating an axis level power density for each frequency band;

determining an axis-level percentage of the maximum power density limit based on the surface level power density as a percentage of the maximum power density limit for each frequency band; and determining a total axis-level percentage of the maximum power density limit by adding the surface level power density as a percentage of the maximum power density limit for each frequency band.

16. The method of claim 15, wherein determining whether the proposed radio frequency transmission site is one of approved, conditionally approved, or not approved based at least in part on the maximum power density limit comprises:

if the total surface-level percentage is less than a first threshold, the proposed radio frequency transmission site is approved;

if the total surface-level percentage is greater than a first threshold but less than a second threshold, the proposed radio frequency transmission site is conditionally approved subject to one or more mitigation requirements; and if the total surface-level percentage is greater than the second threshold, the proposed radio frequency transmission site is not approved.

17. The method of claim 16, wherein one or more the mitigation requirements include at least one of a posted sign, an on-site inspection, an on-site power density reading, a re-design of the proposed radio frequency transmission site, and a landlord letter.

18. The method of claim 14, wherein calculating the at least one percentage of the maximum power density limit comprises, for a service antenna:

calculating an axis level power density for each frequency band;

determining an axis-level percentage of the maximum power density limit based on a surface level power density as a percentage of the maximum power density limit for each frequency band; and determining a total axis-level percentage of the maximum power density limit by adding the surface level power density as a percentage of the maximum power density limit for each frequency band.

19. A non-transitory computer readable storage medium comprising code to perform the acts of the method of claim 10.

* * * * *